(12) United States Patent
Bauer et al.

(10) Patent No.: US 8,402,466 B2
(45) Date of Patent: Mar. 19, 2013

(54) PRACTICAL CONTENTION-FREE DISTRIBUTED WEIGHTED FAIR-SHARE SCHEDULER

(75) Inventors: Daniel N. Bauer, Birmensdorf (CH); Kristijan Dragicevic, Zurich (CH); Luis Garcés-Erice, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 1067 days.

(21) Appl. No.: 12/372,056

(22) Filed: Feb. 17, 2009

(65) Prior Publication Data

US 2010/0211954 A1    Aug. 19, 2010

(51) Int. Cl.
*G06F 9/455* (2006.01)
*G06F 9/46* (2006.01)
(52) U.S. Cl. ........................................................ 718/103
(58) Field of Classification Search .................. None
See application file for complete search history.

(56) References Cited

U.S. PATENT DOCUMENTS

| | | | |
|---|---|---|---|
| 6,909,691 B1 * | 6/2005 | Goyal et al. | 370/230 |
| 7,080,379 B2 * | 7/2006 | Brenner et al. | 718/105 |
| 2005/0220114 A1 * | 10/2005 | Romano et al. | 370/395.4 |
| 2005/0243853 A1 * | 11/2005 | Bitar et al. | 370/432 |

* cited by examiner

*Primary Examiner* — Corey S Faherty
(74) *Attorney, Agent, or Firm* — Scully, Scott, Murphy & Presser, P.C; Daniel P. Morris, Esq.

(57) ABSTRACT

Embodiments of the invention provide a method, system and computer program product for scheduling tasks in a computer system. In an embodiment, the method comprises receiving a multitude of sets of tasks, and placing the tasks in one or more task queues. The tasks are taken from the one or more task queues and placed in a priority queue according to a first rule. The tasks in the priority queue are assigned to a multitude of working threads according to a second rule based, in part, on share values given to the tasks. In an embodiment, the tasks of each of the sets are placed in a respective one task queue; and all of the tasks in the priority queue from each of the task queues, are assigned as a group to one of the working threads.

20 Claims, 5 Drawing Sheets

STEPS OF THE CONSUMER THREAD

SCHEME OF THE PRODUCER/CONSUMER ARCHITECTURE

STEPS OF THE WAITED FAIR-SHARE SCHEDULER

STEPS OF THE CONSUMER THREAD

PRACTICAL CONTENTION-FREE DISTRIBUTED WEIGHTED FAIR-SHARE SCHEDULER

BACKGROUND OF THE INVENTION

1. Field of the Invention

The present invention generally relates to multi-processor computer systems, and more specifically, to scheduling the execution of tasks in such computer systems.

2. Background Art

Schedulers are used at many levels in computing systems, ranging from the low levels of operating systems up to the middleware and application level. Their function is to define an ordering for the execution of tasks according to a defined metric. A weighted fair-share scheduler is a scheduler that respects the importance and urgency of tasks by assigning a weight to each task. If a task is of high weight, it will rather and more often be scheduled than a task of lower weight. Different strategies exist to decide which task to schedule next: introducing deadlines (in virtual time as well as in real time), assigning credits to tasks, or using randomization strategies. The basic data structure for a weighted fair-share scheduler is the priority queue.

The recent trend in hardware to build multiprocessors, rather than faster CPUs, strongly encourages the distribution of software systems to enable full exploitation of parallelism. A distributed scheduler takes advantage of the parallelism offered by multi-core CPUs. Since the priority queue is hard to parallelize, most solutions making use of many threads accessing this data structure lead to an unacceptable amount of contention. This fact reduces the performance and scalability of most concurrent priority queues (and thus of distributed schedulers).

In a soft real-time system like a time-sensitive publisher/subscriber engine, variances that come along in high contention scenarios are even more critical. Publish/subscribe is a method by which data is organized in topics. All messages published on a topic are received by all subscribers to that topic. As one example, a time-sensitive, work-conserving publisher/subscriber engine may be used to guarantee each topic a share of the available resources. The core component of the engine is the weighted-fair share scheduler that schedules topics according to their guaranteed share.

As long as there is only one processor, using a priority queue, combined with e.g. an Earliest Deadline First (EDF) schedule, solves this problem trivially. On multi-core architectures, there is more than one processor which is able to serve a topic. This can be exploited by using concurrent priority queues, which allow many threads to access the data structure. The complexity of this approach is a major drawback.

SUMMARY OF THE INVENTION

Embodiments of the invention provide a method, system and computer program product for scheduling tasks in a computer system including multiple working threads for processing the tasks. In an embodiment, the method comprises receiving a multitude of sets of tasks, and placing the tasks in one or more task queues; giving each of the tasks an associated share value; and taking the tasks from the one or more task queues and placing the tasks in a priority queue according to a first defined rule. The tasks in the priority queue are assigned to the working threads according to a second defined rule based, in part, on the share values given to the tasks.

In an embodiment, the placing includes placing the tasks of each of the sets in a respective one of the task queues; and the taking includes taking all of the tasks from one of the task queues, and placing said all of the tasks in the priority queue. Also, in this embodiment, all of the tasks in the priority queue from each of the task queues, are assigned as a group to one of the working threads. In an embodiment, the assigning includes maintaining a first table that identifies, for each of the set of tasks, the working thread to which the last task in said each set was assigned; and maintaining a second table that identifies, for each of the working threads, the set of tasks from which said each working thread was last assigned a task. In this embodiment, the first and second tables are used to determine which of the working threads the tasks from the priority queue are assigned to.

In an embodiment, each of the working threads has a work queue, and the assignment of the tasks to the working threads is done by putting the tasks from the priority queue into the work queues of the working threads, and ensuring that each of the work queues has, at any one time, only tasks from one of the sets of tasks. In an embodiment, the assignment of the tasks includes maintaining a list of the working threads that are available to process the tasks, and assigning the tasks from the priority queue to processes on said list.

An embodiment of the invention utilizes the producer/consumer architecture, and addresses the issue of how producers and consumers can be organized to reduce contention and sharing of data.

Embodiments of the invention utilize a mechanism which passes messages from producers (for example, IO-threads that read messages from a socket) to consumers (for example, worker-threads handling the message read). Since there is a share associated to the topic of the message which has to be respected, it is not possible for the IO-thread to handle the message directly to the consumer. A scheduler is needed that ensures the compliance with the shares. In the present invention, the scheduler distributes the work to a set of worker-threads for exploiting multi-core.

DETAILED DESCRIPTION OF THE PREFERRED EMBODIMENTS

Figure 1:
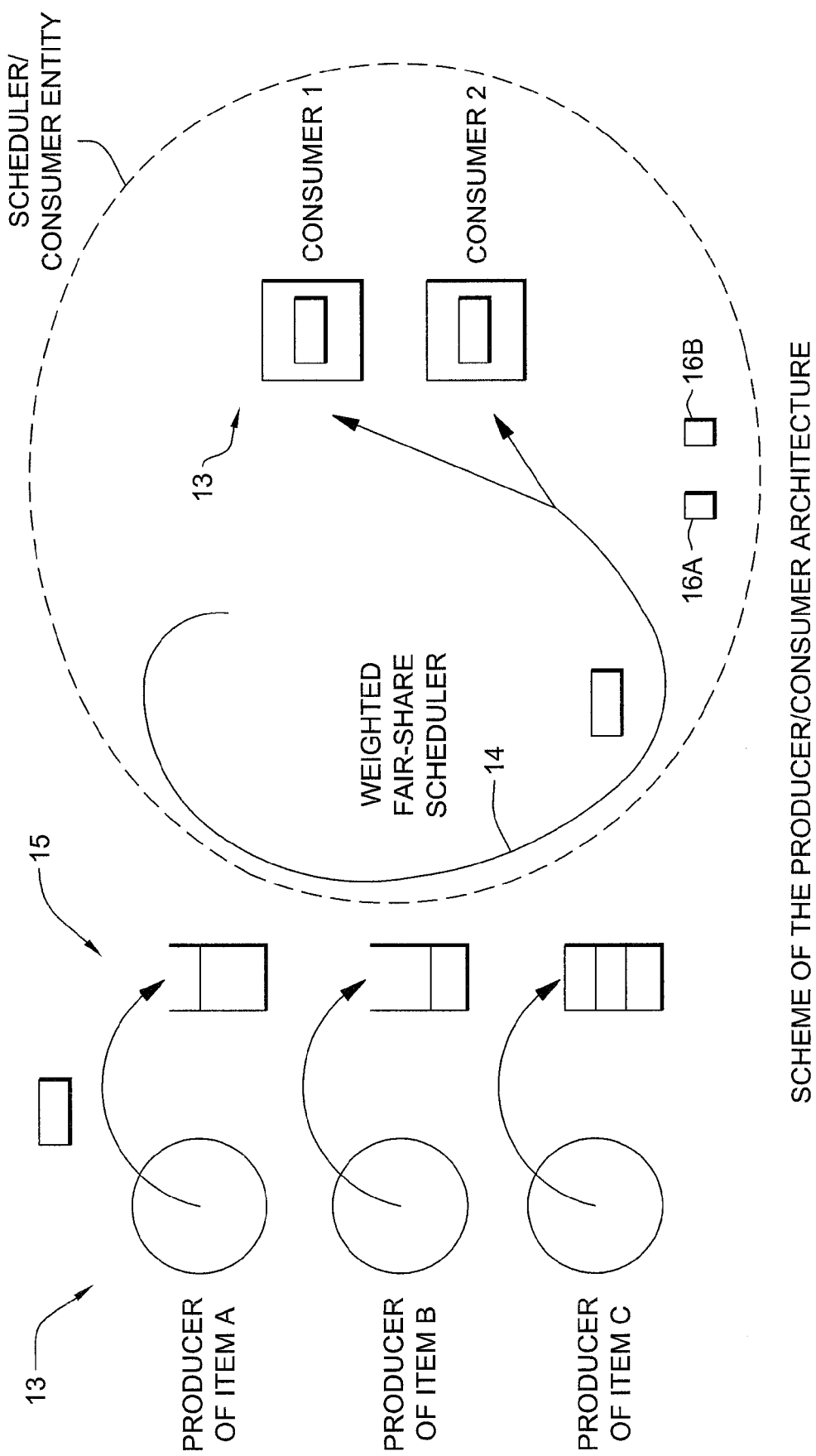
FIG. 1 is a schematic illustration of a producer/consumer architecture.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

As mentioned above, schedulers are used at many levels in computing systems, and their function is to define an ordering for the execution of tasks according to a defined metric. More specifically, a weighted fair-share scheduler is a scheduler that respects the importance and urgency of tasks by assigning a weight to each task, and the basic data structure for a weighted fair-share scheduler is the priority queue. The present invention addresses the issue of providing a weighted fair-share scheduler on a multi-core computer system, having concurrent priority queues that allow many threads to access the data structure.

Embodiments of the invention are described below in the context of a multi-core producer/consumer architecture, and in particular, the invention provides this architecture with a weighted fair-share scheduler. The invention addresses the issue of how, in this architecture, the producers and consumers can be organized to reduce contention and sharing of data.

Embodiments of the invention utilize a mechanism which passes messages from producers (for example, IO-threads that read messages from a socket) to consumers (for example, worker-threads handling the message read). Since there is a share associated to the topic of the message which has to be respected, it is not possible for the IO-thread to handle the message directly to the consumer. A scheduler is needed that ensures the compliance with the shares. In the present invention, the scheduler distributes the work to a set of worker-threads for exploiting multi-core.

FIG. 1 illustrates a producer/consumer architecture, including a series of producers 12, a group of consumers 13, and a weighted fair-share scheduler 14. Each producer-thread (such as an IO-thread) produces items of a certain product (corresponds to a topic) from producers. Each product is assigned a share that indicates how many items of a product shall be consumed in relation to other products. So, if a product "A" has two times the share of product "B", two times more items of "A" than of "B" shall be consumed. The scheduler manages a set of consumers (corresponds to worker-threads) that consume any item assigned to them. The scheduler-thread together with the consumer-threads forms an alternative to a distributed scheduler.

Figure 2:
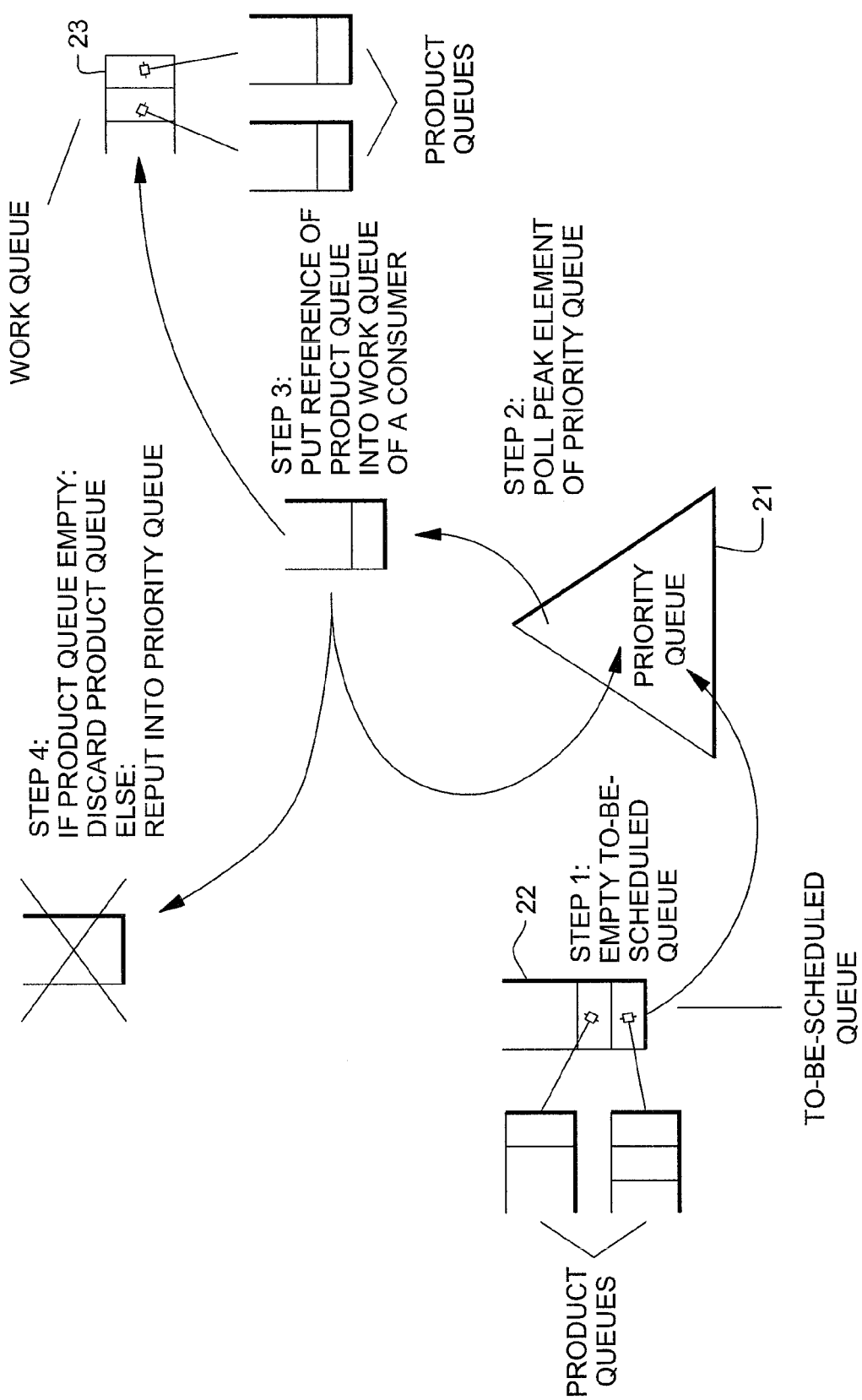
FIG. 2 shows steps of a weighted fair-share scheduler in an embodiment of the present invention.

With reference to FIGS. 1 and 2, each item of a certain product is put by a producer in its product queue 15, which, in this example, is a wait-free read FIFO queue. The product queue is also extended by a counter. If the counter is 0, this indicates that the scheduler has removed the product queue from the priority queue 21 of product queues. In this case, the producer adds the product queue to the "to-be-scheduled" queue 22, which, in this example, is a lock-free FIFO queue. If the counter is not 0, the scheduler keeps per definition the product queue in the priority queue.

The scheduler performs a loop repeating following steps. First, it empties the "to-be-scheduled" queue of product queues and adds them to the priority queue. After that, the scheduler fetches the product queue of highest priority from the priority queue and assigns that product queue to a consumer. The decision of which consumer to choose is made in two steps.

First, the scheduler maintains two hash tables. One table, represented at 16A in FIG. 1, where for each product is listed which consumer has consumed that product's previous item, and another, represented at 16B in FIG. 1, where for each consumer is listed of which product the consumer has consumed the last item. If in both hash tables the same product and consumer are associated, this consumer was definitely the last consumer consuming an item of that product and might be even still working on items of that product. Thus, the scheduler assigns the product queue to this consumer's "work queue" 23, which is also a lock-free FIFO queue.

The "work queue" of a consumer always contains elements of the same product only and never a mix of different product. So, a "work queue" may contain multiple references to the same product queue. By this method, we can continue with scheduling another product, even if the items of the just scheduled product are produced very fast. Furthermore, we ensure that, if another consumer consumes an item of a product different than before, the previous consumer has finished consuming the preceding item, which is important since we want to guarantee ordering of the consumption of items.

Figure 3:
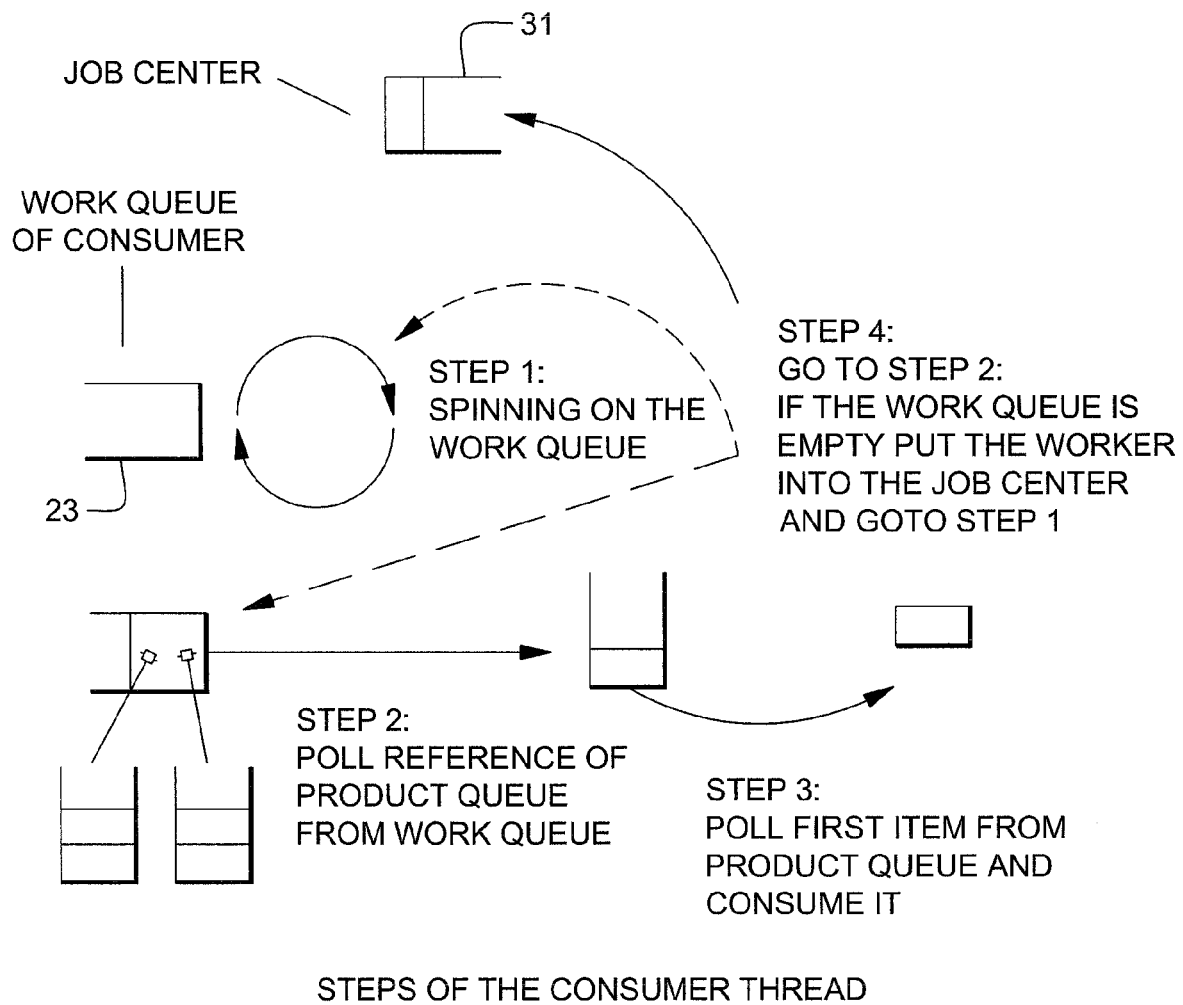
FIG. 3 depicts steps of the consumer thread in an embodiment of this invention.

The second step in deciding which consumer to choose is taken if the two hash tables do not have the same consumer and product associated. In this case, a consumer of a "job center", (illustrated at 30 in FIG. 3), which, in this example, is a lock-free FIFO queue, is chosen. If there is no consumer in the "job center", the scheduler applies busy waiting on the "job center" queue (this should not be a problem in many-core systems). Both hash tables are updated afterwards. The respective consumer is polled from the "job center" and the product queue is added to this consumer's "work queue". After adding the product queue to the "work queue", the product queue counter is decreased by one. If the counter is zero, the product queue is not added to the priority queue.

A consumer maintains a "work queue" on which it polls items. If the polling fails a defined number of times, the consumer puts itself into the "job center" and goes sleeping.

In the above-discussed application, this architecture shows a reasonable scalability for up to 10 threads. The scalability depends on the work the consumers have to fulfill. The more work a consumer has to perform per item, the better this solution scales. But even if this architecture reaches its limits, it can be extended to a highly scalable system by replicating the scheduler/consumer entity multiple times. Therefore, the products may be clustered and each assigned to exactly one replica. Since for an n-core SMP machine, we have to accept a quantizing effect that implicates that no product can be assigned a higher share than $1/n$, we can estimate how big the error would be if we apply such a distribution strategy of products to scheduler/consumer entities.

We assume that the order of consuming items within a product has to be strictly respected. Consequently, at most, one item of a product at a time may be consumed. So if we have k cores, we can theoretically run k consumers in parallel, each consuming an item of a different product. Hence, the maximum share of each product can be $1/k$. So, if we have s schedulers and n consumers per scheduler, we have at most a share of $1/(n \cdot s)$ per product. The worst case for this scenario is when we have between $n \cdot s + 1$ and $n \cdot s + s - 1$ products, each product with equal share. If we have more products to process, the error per product becomes obviously lower, because we can couple lower shares together so that the overall error becomes lower. For the same reason, a scenario where for all products we do not have an equal share, does not lead to a worst-case scenario.

Now, if we have $n \cdot s + 1$ products, we can assign n products to each scheduler/consumer entity. Since we have s schedulers, one product remains that has to be assigned to one of said entities. Thus, one scheduler is handling $n+1$ products, and $s-1$ schedulers are handling n products. Hence, $n+1$ products get a share of $1/((n+1) \cdot s)$ instead of $1/(n \cdot s+1)$ and the remaining products get a share of $1/(n \cdot s)$.

In the present case, scalability is observed for up to ten consumer threads. So, two separated schedulers can be used for at least 10 consumers. Consequently, the lowest values for n and s are 2 and 5, respectively. If we have $n \cdot s + 1 = 2 \cdot 5 + 1 = 11$ products, then for 6 products the real share is $\frac{1}{12}$ instead of $\frac{1}{11}$, which makes an error of 0.78%, and for 5 products the real share is $\frac{1}{10}$, and thus the error is 0.91%. This means, we will never have a higher deviation of the real share than 0.91% for any product, which makes this distribution strategy viable for applications in most cases.

If we have an arbitrary number of products, the following assignment strategy can be used that is guaranteed to lead to errors that are certainly no worse than the estimated worst case for s schedulers and n consumers per scheduler. Let $\{p_1, \ldots, p_k\}$ be the set of all products, and let for all $i <= j$, the share of $p_i$, $S(p_i) <= S(p_j)$. Then we start by assigning the products $p_1, \ldots, p_s$ to a different scheduler/consumer entity each. The product $p_{s+1}$ is assigned to the same scheduler/consumer entity as product $p_s$. The assignment is continued by assigning every product to a scheduler/consumer entity following two conditions:

1. There exists a scheduler/consumer entity that was assigned more products; and
2. All scheduler/consumer entities with the same number of assigned products have an equal or higher accumulated share.

Figure 4:
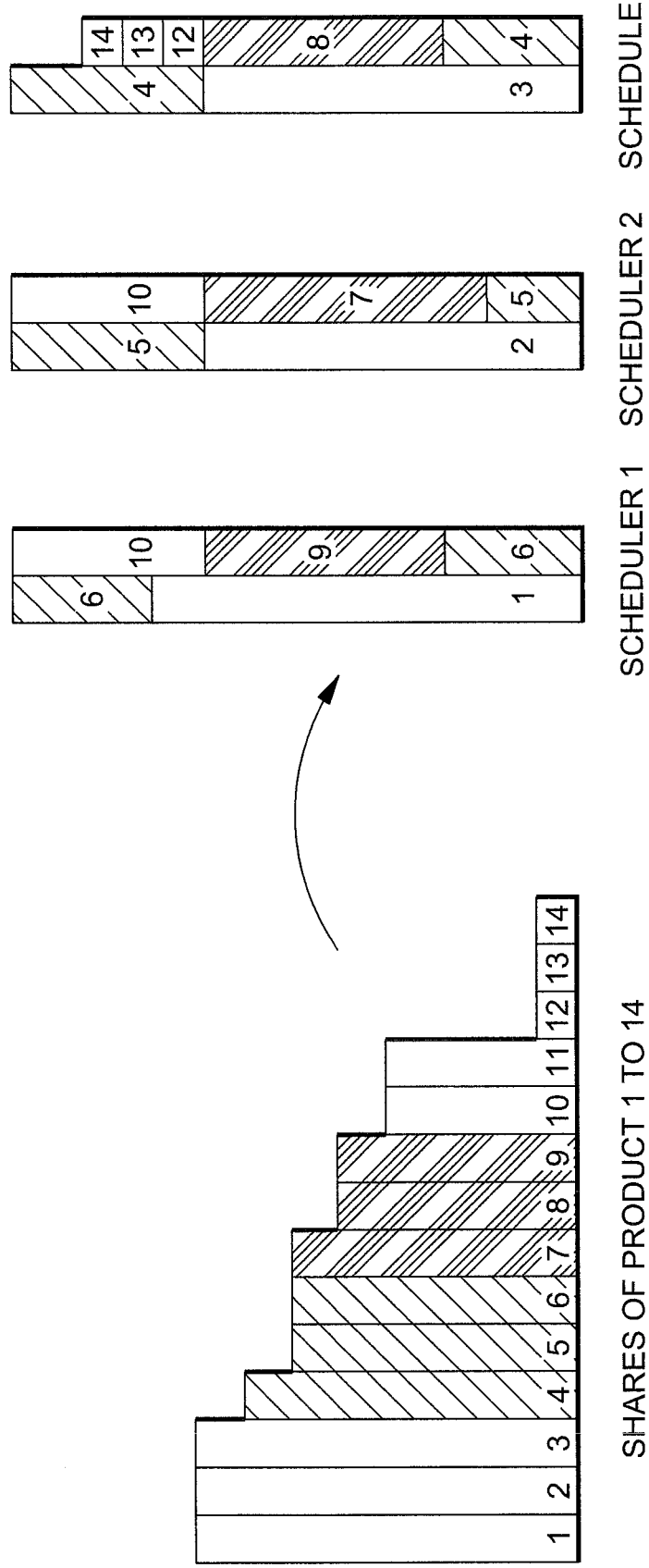
FIG. 4 illustrates an example of assigning products to scheduler/consumer entities in accordance with embodiments of the invention.

If all scheduler/consumer entities have the same number of products assigned, the first condition is ignored. This strategy is repeated until the first $n \cdot s$ products have been assigned. The remaining products are then assigned to the scheduler/consumer entity with lowest accumulated share ignoring the number of assigned products. FIG. 4 shows an example of this assignment strategy. The reason that it is desirable to make sure that the first $n \cdot s$ products are distributed evenly is because this facilitates the desired work conserving property the scheduler should provide.

The entire architecture has a manageable number of contention points:

1. The items in the product queue are put by the producers and taken by the consumers;
2. The counter of the product queue is decreased by the scheduler and increased by the producers;
3. The references of the product queues in the work queues are put by the scheduler and taken by the consumers; and
4. The references in the job center are put by the consumers and taken by the scheduler.

Contention point 1 is very marginal since there are at most two tasks contending, and even if there is a contention, they work on different endings of the product queue which is a FIFO queue where such accesses are easily handled concurrently. Contention point 2 is very marginal as well, because the operation is only an update of an integer, which is a very fast operation. Here the maximum number of tasks contending at this point is also two. Contention point 3 is also very marginal, because here again there are only at most two tasks contending on a lock-free FIFO queue. Contention point 4 is noticeable but not critical, since many tasks access the job center but this does not happen frequently. After all it is, again, a lock-free FIFO queue that allows making such accesses still quite efficient.

Figure 5:
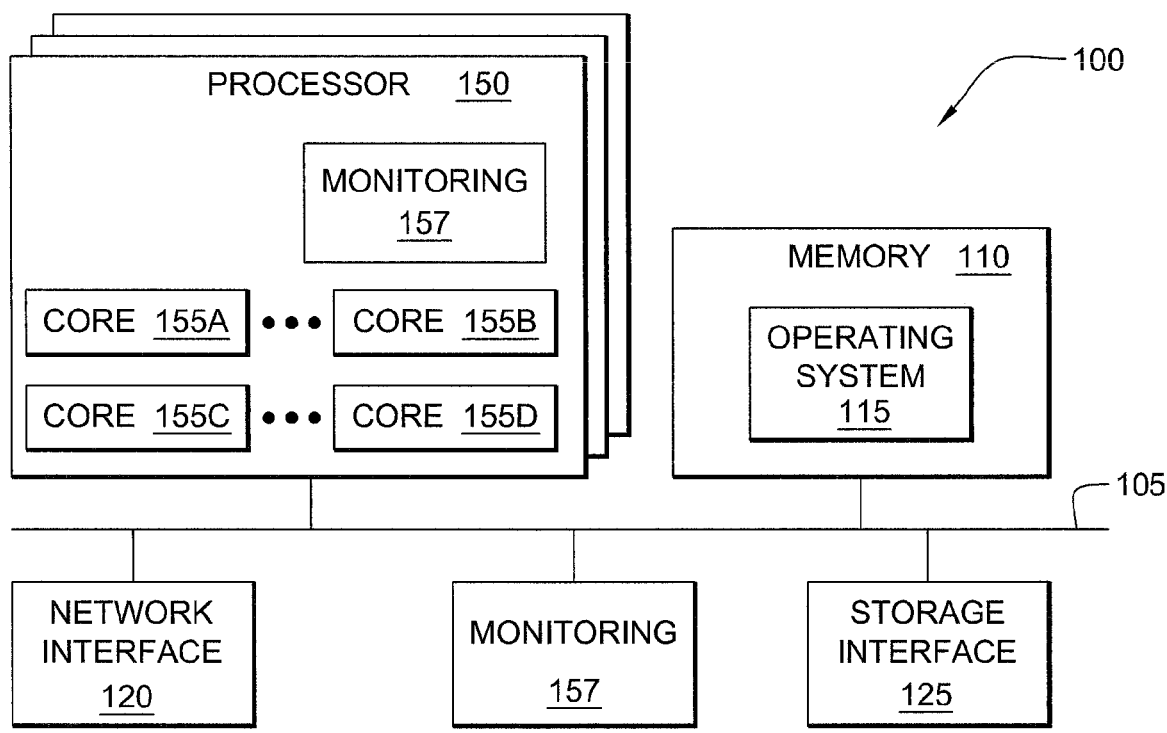
FIG. 5 shows a computing environment in which this invention may be implemented.

FIG. 5 is a schematic block diagram of an exemplary computer system environment 100 including a multi-core processor 150 in which the present invention may be implemented. The computer system 100 illustratively includes a memory 110, a network interface 120, a storage interface 125, a monitoring module 157 and one or more multi-core processors 150 interconnected by a system bus 105. The memory 110 illustratively includes an operating system 115 that configures the computer 100 for basic services. It should be noted that while memory 110 is shown interconnected with the system bus 105, in alternative embodiments, the memory 110 may be directly attached to the processors 150 and/or other components. As such, the description of memory 110 being connected to system bus 105 should be taken as exemplary only. Illustratively, the operating system 115 may comprise a multi-threaded operating system that is configured to execute various threads on the plurality of cores 155. Additionally, the memory 110 may include one or more applications (not shown) executing in conjunction with the operating system 115.

The network interface 120 comprises mechanical, electrical and signaling circuitry needed to connect the system to other systems over a network. The storage interface 125 coordinates with the operating system executing on the system to store and retrieve information requested on any type of attached array of writable storage device media such as video tape, optical, DVD, magnetic tape, bubble memory, electronic random access memory, micro-electromechanical and any other similar media adapted to store information, including data and/or parity information.

The multi-core processor 150 illustratively includes a plurality of cores 155A-D. It should be noted that any number of cores may be utilized in a single processor and any number of processors may be utilized in a single computer 100. As such, the description of four cores 155A-D in a single processor 150 should be taken as exemplary only. In accordance with an illustrative embodiment of the present invention, a monitoring module 157 is included within processor 150. The monitoring module 157, which may be included within processor 150 or may be external to the processor.

Furthermore, the monitoring module 157 may modify service rates for each of the cores to optimize instruction rate throughput The monitoring module may utilize various features of the processor in obtaining and/or setting instruction arrival rates, e.g., the processor may include functionality to enable external monitoring of instruction arrival rates. Alternatively, many cores include functionality to count retired instructions during a predefined time period. In processors using such cores, the functionality of the monitoring module may be implemented directly into each core. As such, the description of the monitoring module comprising a separate module internal or external to the processor should be taken as exemplary only. In illustrative embodiments, the functionality of the monitoring module may be directly integrated into the cores of a processor. As such, the description of a separate monitoring module should be taken as exemplary only.

What is claimed is:

1. A method of scheduling tasks in a computer system including multiple working threads for processing the tasks, and wherein each of a multitude of producers generate a set of tasks of a certain product, the method comprising:
   receiving the multitude of sets of tasks, and placing the tasks in one or more task queues;
   giving each of the tasks an associated share value representing the number of tasks of each product to be processed relative to the number of tasks of the other products; and
   using a weighted, fair-share scheduler for taking the tasks from the one or more task queues and placing the tasks in a priority queue according to a first defined rule, and assigning the tasks in the priority queue to the working threads according to a second defined rule based, in part, on the share values given to the tasks.

2. The method according to claim 1, wherein the placing includes placing the tasks of each of the sets in a respective one of the task queues.

3. A method scheduling tasks in a computer system including multiple working threads for processing the tasks, the method comprising:
   receiving a multitude of sets of tasks, and placing the tasks in one or more task queues;
   giving each of the tasks an associated share value; and
   using a weighted, fair-share scheduler for taking the tasks from the one or more task queues and placing the tasks in a priority queue according to a first defined rule, and assigning the tasks in the priority queue to the working threads according to a second defined rule based, in part, on the share values given to the tasks; and wherein:
   the placing includes placing the tasks of each of the sets in a respective one of the task queues the taking includes taking all of the tasks from one of the task queues, and placing said all of the tasks in the priority queue.

4. The method according to claim 3, wherein all of the tasks in the priority queue from each of the task queues, are assigned as a group to one of the working threads.

5. The method according to claim 2, wherein each of the task queues has a counter, and the taking includes, when all of the tasks from one of the task queues are removed from the priority queue, setting the counter of said one of the task queues to a given value.

6. The method according to claim 1, wherein the assigning includes:
   maintaining a first table that identifies, for each of the set of tasks, the working thread to which the last task in said each set was assigned;
   maintaining a second table that identifies, for each of the working threads, the set of tasks from which said each working thread was last assigned a task; and
   using the first and second tables to determine to which of the working threads the tasks from the priority queue are assigned to.

7. The method according to claim 1, wherein each of the working threads has a work queue, and the assigning includes:
   putting the tasks from the priority queue into the work queues of the working threads; and
   ensuring that each of the work queues has, at any one time, only tasks from one of the sets of tasks.

8. The method according to claim 1, further comprising maintaining a list of the working threads that are available to process the tasks, and wherein the assigning includes assigning the tasks from the priority queue to working threads on said list.

9. The method according to claim 8, wherein each of the working threads has a work queue; and wherein:
   the assigning includes putting the tasks from the priority queues into the work queues of the working threads; and
   the maintaining includes, each of the working threads periodically checking the work queue of said each working thread and, when said work queue is empty, putting said each working thread on said list.

10. The method according to claim 1, wherein the computer system includes a plurality of scheduler/working thread entities, and the method further comprises assigning the tasks to one of the scheduler/working thread entities in accordance with the following conditions: there exists a scheduler/working thread entity that was assigned more tasks; and all scheduler/working thread entities with the same number of assigned tasks have an equal or higher accumulated share value.

11. A scheduling system for scheduling tasks in a computer system including multiple working threads for processing the tasks, and wherein each of a multitude of producers generate a set of tasks of a certain product, the scheduling system comprising:
one or more hardware processing units configured for:
receiving the multitude of sets of tasks, and placing the tasks in one or more task queues;
giving each of the tasks an associated share value representing the number of tasks of each product to be processed relative to the number of tasks of the other products;
functioning as a weighted, fair-share scheduler for taking the tasks from the one or more task queues and placing the tasks in a priority queue according to a first defined rule, and
assigning the tasks in the priority queue to the working threads according to a second defined rule based, in part, on the share values given to the tasks.

12. The scheduling system according to claim 11, wherein:
the placing includes placing the tasks of each of the sets in a respective one of the task queues;
the taking includes taking all of the tasks from one of the task queues, and placing said all of the tasks in the priority queue; and
all of the tasks in the priority queue from each of the task queues, are assigned as a group to one of the working threads.

13. The scheduling system according to claim 11, wherein the assigning includes:
maintaining a first table that identifies, for each of the set of tasks, the working thread to which the last task in said each set was assigned;
maintaining a second table that identifies, for each of the working threads, the set of tasks from which said each working thread was last assigned a task; and
using the first and second tables to determine to which of the working threads to assign the tasks from the priority queue.

14. The scheduling system according to claim 11, wherein each of the working threads has a work queue, and the assigning includes:
putting the tasks from the priority queue into the work queues of the working threads; and
ensuring that each of the work queues has, at any one time, only tasks from one of the sets of tasks.

15. The scheduling system according to claim 11, wherein said one or more hardware processing units are further configured for maintaining a list of the working threads that are available to process the tasks, and assigning includes assigning the tasks from the priority queue to working theads on said list.

16. An article of manufacture comprising:
at least one tangible non-transitory computer usable medium having computer readable program code logic tangibly embodied therein to execute a machine instruction in a processing unit for scheduling tasks in a computer system including multiple working threads for processing the tasks, and wherein each of a multitude of producers generate a set of tasks of a certain product, said computer readable program code logic, when executing, performing the following steps:
receiving the multitude of sets of tasks, and placing the tasks in one or more task queues;
giving each of the tasks an associated share value representing the number of tasks of each product to be processed relative to the number of tasks of the other products;
taking the tasks from the one or more task queues and placing the tasks in a priority queue according to a first defined rule; and
assigning the tasks in the priority queue to the working threads according to a second defined rule based, in part, on the share values given to the tasks.

17. The article of manufacture according to claim 16, wherein:
the placing includes placing the tasks of each of the sets in a respective one of the task queues,
the taking includes taking all of the tasks from one of the task queues, and placing said all of the tasks in the priority queue; and
all of the tasks in the priority queue from each of the task queues, are assigned as a group to one of the working threads.

18. The article of manufacture according to claim 16, wherein the assigning includes:
maintaining a first table that identifies, for each of the set of tasks, the working thread to which the last task in said each set was assigned;
maintaining a second table that identifies, for each of the working threads, the set of tasks from which said each working thread was last assigned a task; and
using the first and second tables to determine to which of the working threads the tasks from the priority queue are assigned to.

19. The article of manufacture according to claim 16, wherein each of the working threads has a work queue, and the assigning includes:
putting the tasks from the priority queue into the work queues of the working threads; and
ensuring that each of the work queues has, at any one time, only tasks from one of the sets of tasks.

20. The article of manufacture according to claim 16, wherein the assigning includes maintaining a list of the working threads that are available to process the tasks, and assigning the tasks from the priority queue to processes on said list.

* * * * *